United States Patent [19]

Groves

[11] Patent Number: 4,846,318
[45] Date of Patent: Jul. 11, 1989

[54] ELECTRICAL CONNECTOR FOR SHOCK ABSORBERS

[75] Inventor: Gary W. Groves, Monroe, Mich.

[73] Assignee: Monroe Auto Equipment Company, Monroe, Mich.

[21] Appl. No.: 105,404

[22] Filed: Oct. 5, 1987

[51] Int. Cl.$^4$ ............................ F16F 9/46; H01R 9/00
[52] U.S. Cl. ..................................... 188/299; 439/368
[58] Field of Search .................. 188/299, 319, 322.22, 188/311; 267/64.16; 280/707, 6.1; 439/682, 692, 695, 904, 905, 352, 355, 368; 251/129.04; 174/81, 83, 153 G; 403/282, 338

[56] References Cited

U.S. PATENT DOCUMENTS

| | | | |
|---|---|---|---|
| 3,471,824 | 10/1969 | Greulich et al. | 439/352 X |
| 3,771,626 | 11/1973 | Palmer | 188/315 X |
| 4,125,238 | 11/1978 | Tanaka | 174/153 G X |
| 4,531,798 | 7/1985 | Baur et al. | 439/368 |
| 4,576,258 | 3/1986 | Spisak et al. | 280/707 X |
| 4,597,411 | 7/1986 | Lizell | 188/299 X |
| 4,660,688 | 4/1987 | Spisak et al. | 188/299 |
| 4,734,055 | 3/1988 | Misu | 174/153 G X |

FOREIGN PATENT DOCUMENTS

WO86/06807 11/1986 PCT Int'l Appl.
8707565 12/1987 PCT Int'l Appl. ................. 280/707

Primary Examiner—Robert J. Oberleitner
Attorney, Agent, or Firm—Harness, Dickey, Pierce

[57] ABSTRACT

A shock absorber is disclosed which electrically communicates with an external source of electrical potential. The shock absorber comprises a valve for electrically controlling the flow of damping fluid in the working chamber of the shock absorber. The shock absorber further comprises a connector for allowing the valve to be electrically connected to the source of electrical potential. The connector comprises an adapter shaft communicating with the piston rod of the shock absorber, a female connector assembly connected to the adapter shaft, and a male connector assembly connected to the female connector assembly.

35 Claims, 6 Drawing Sheets

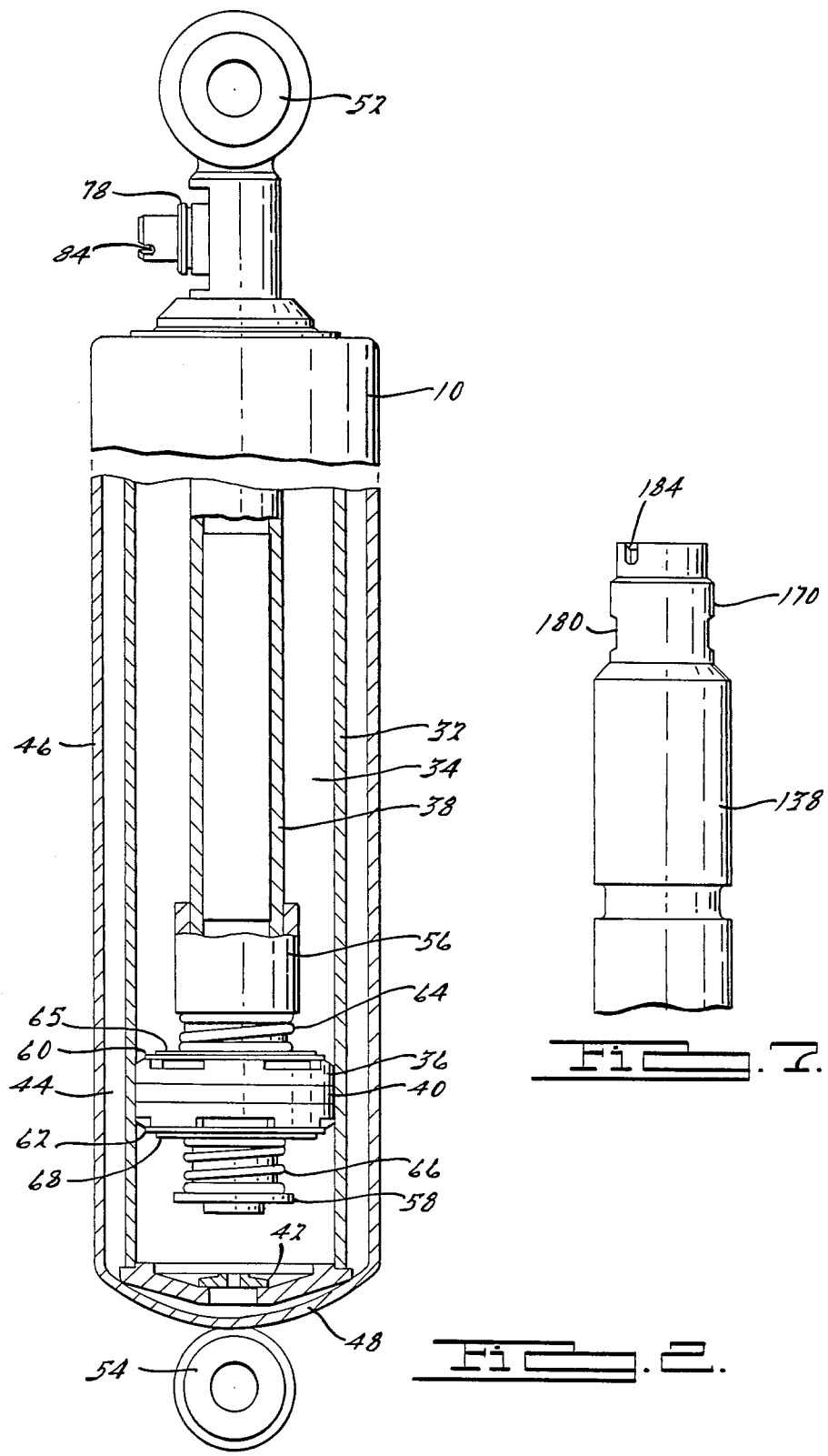

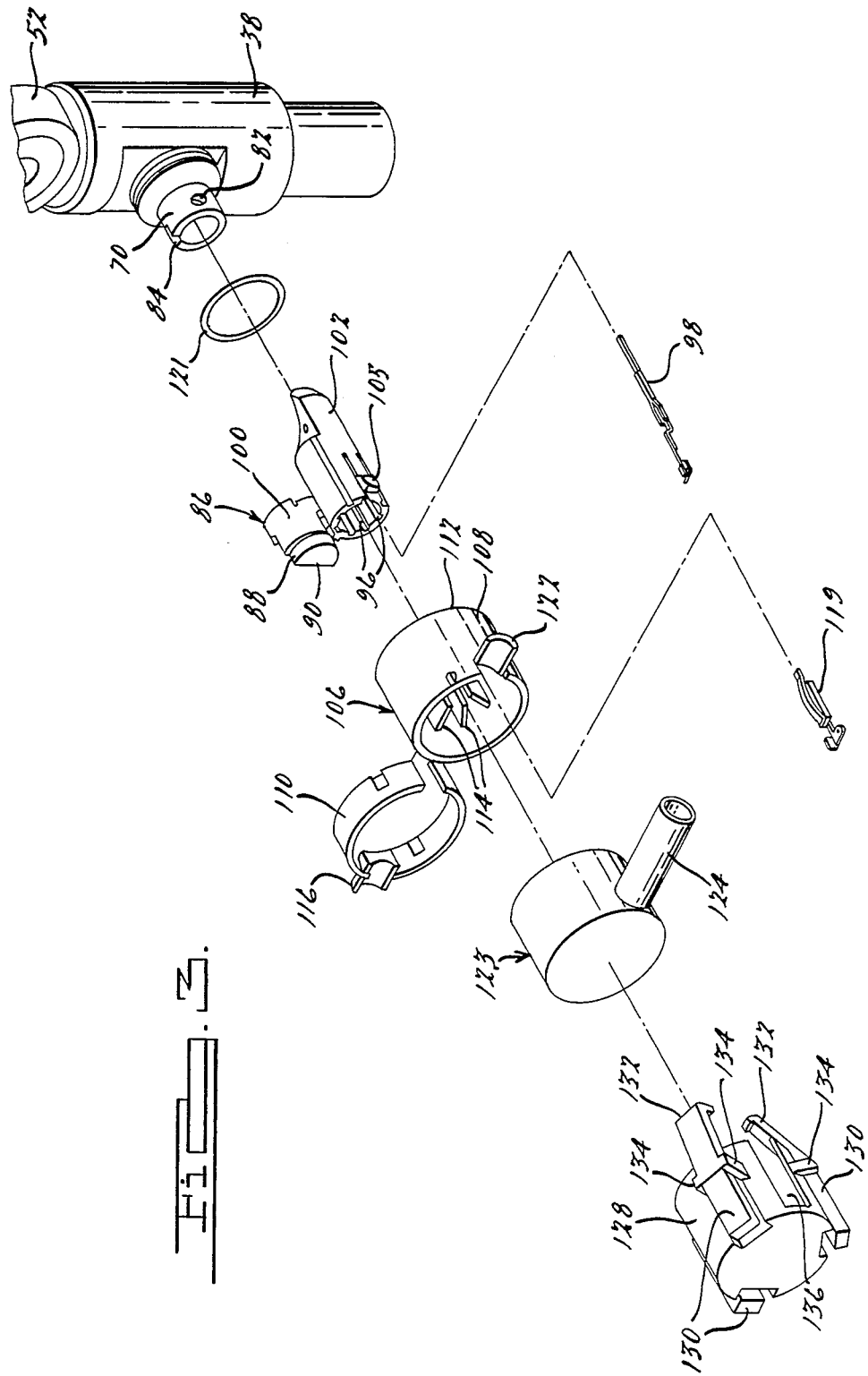

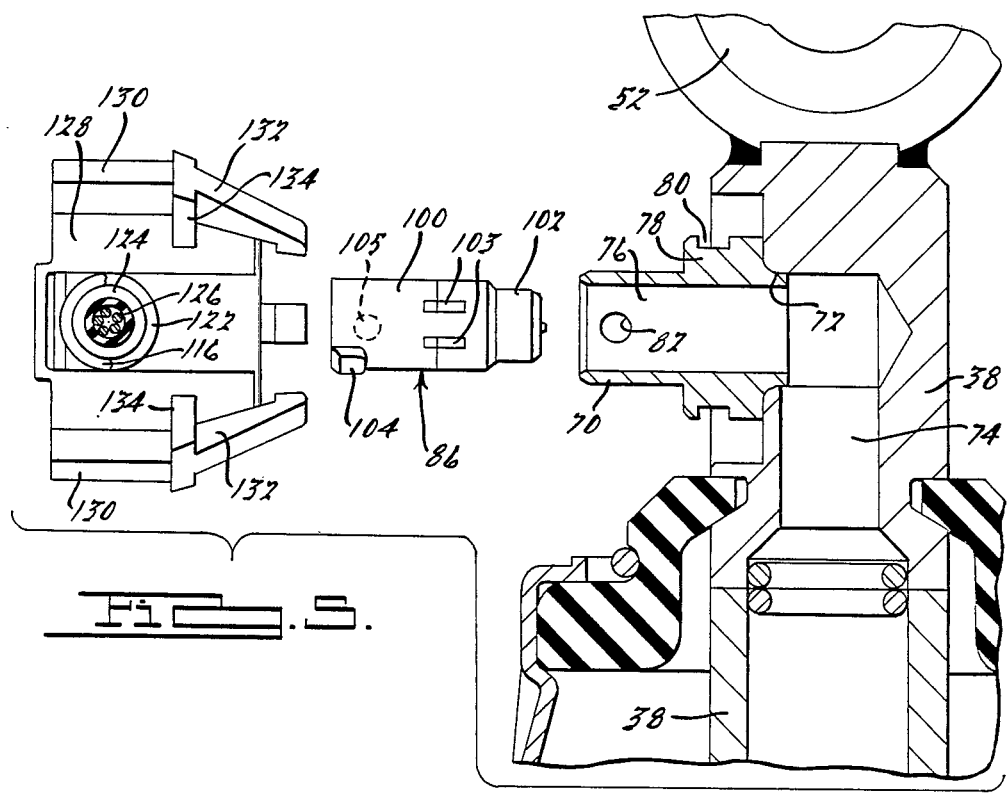
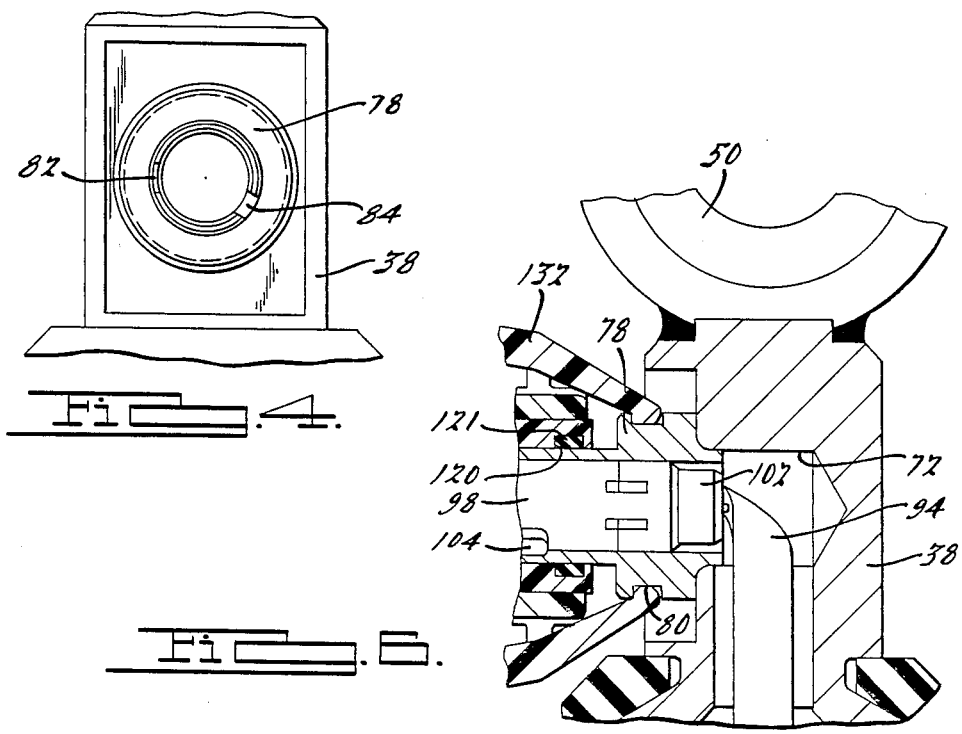

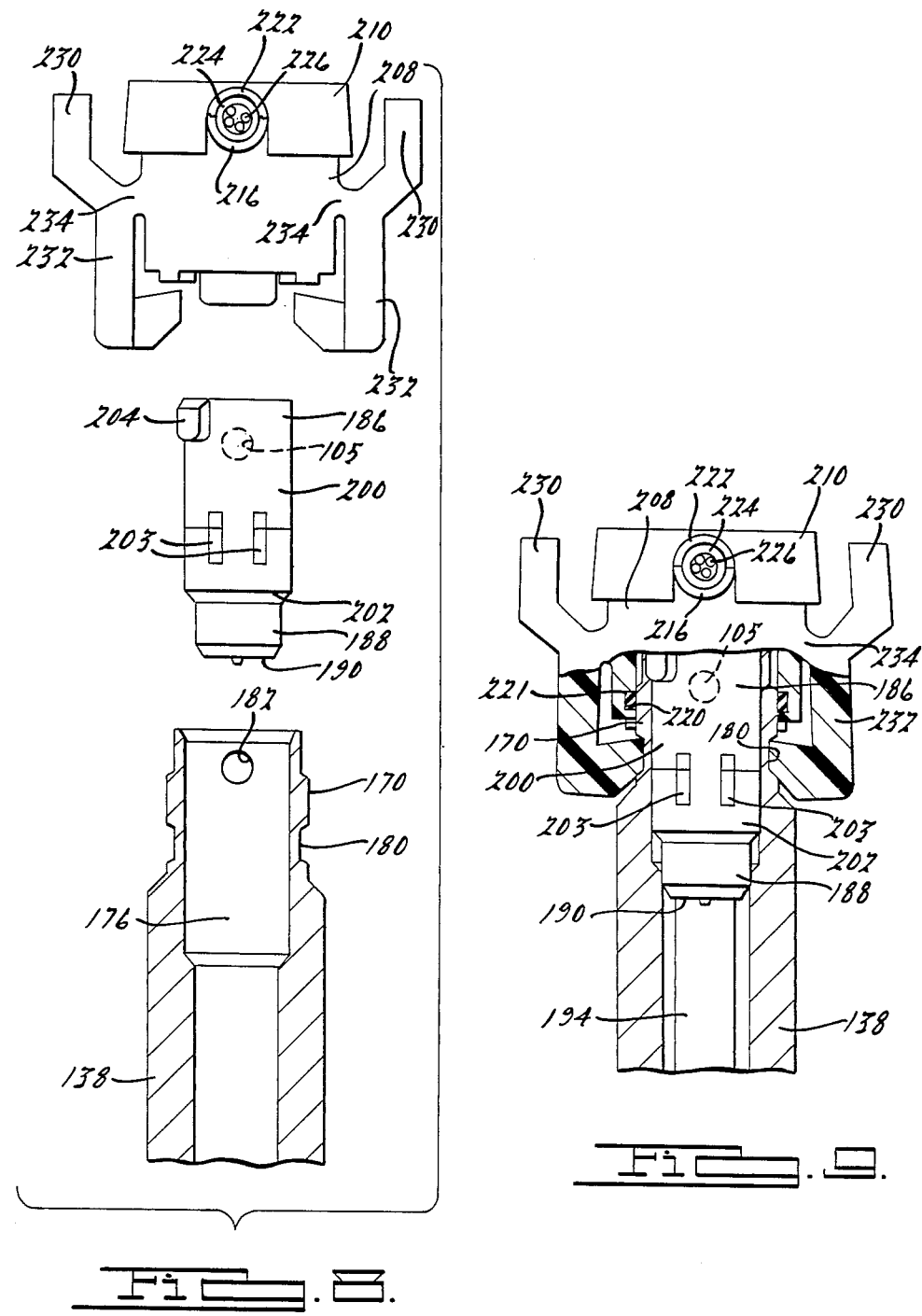

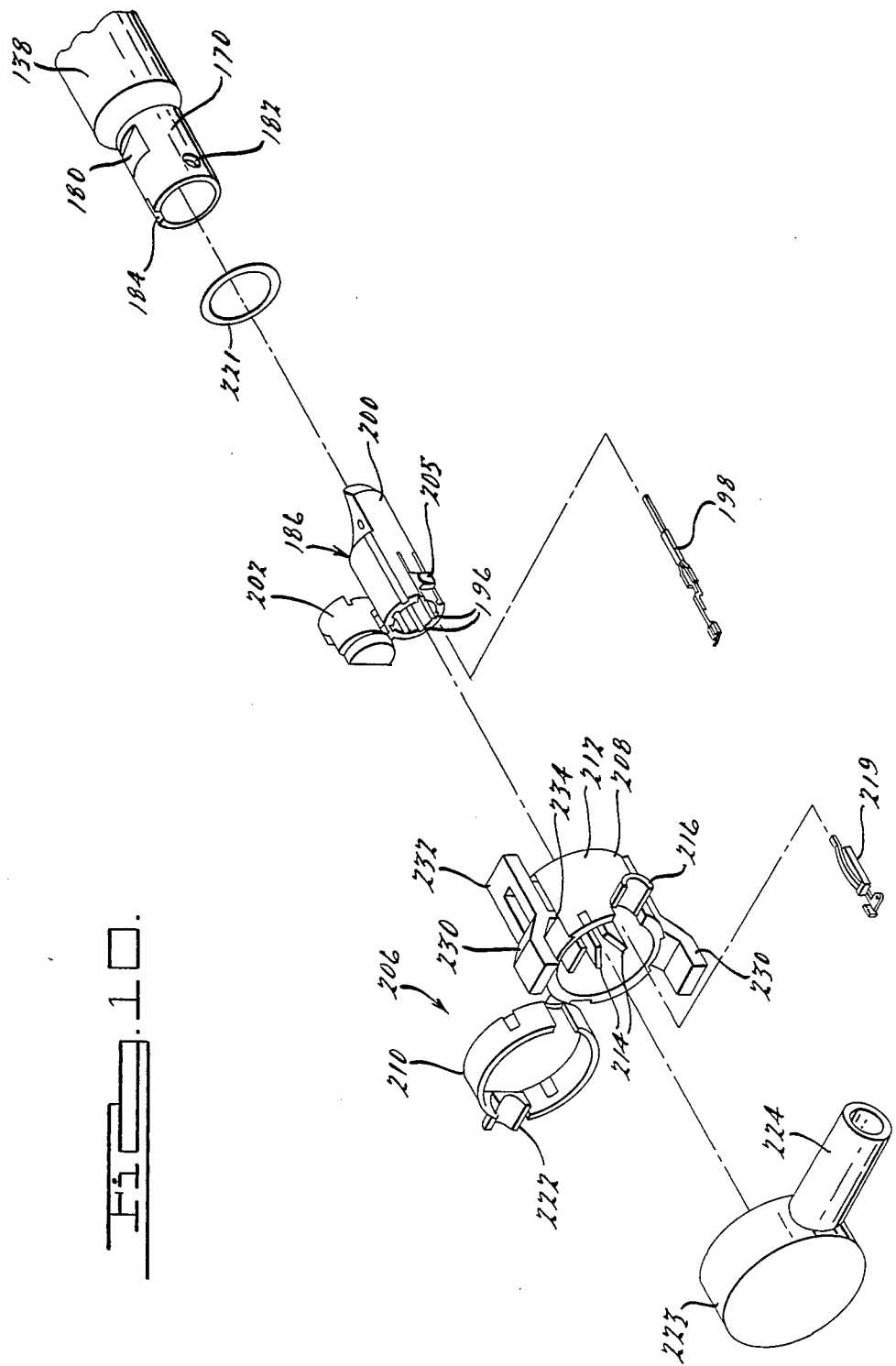

4,846,318

ELECTRICAL CONNECTOR FOR SHOCK ABSORBERS

BACKGROUND OF THE INVENTION

1. Field of the Invention

This invention relates to automotive suspension systems, and more particularly to an electrical connector for shock absorbers.

2. Description of Related Art

Shock absorbers are used in connection with automotive suspension systems to absorb unwanted vibrations which occur during driving. To absorb this unwanted vibration, shock absorbers are generally connected between the body and the suspension of the automobile. A piston is located within the shock absorber and is connected to the body of the automobile through a piston rod. Because the piston is able to limit the flow of damping fluid within the working chamber of the shock absorber when the shock absorber is compressed, the shock absorber is able to produce a damping force which counteracts the vibration which would otherwise be transmitted from the suspension to the body. The greater the degree to which the flow of damping fluid within the working chamber is restricted by the piston, the greater the damping forces which are generated by the shock absorber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the shock absorber. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in U.S. Pat. No. 4,597,411. In this reference, a solenoid is used to selectively open and close an auxiliary opening in a base valve of a shock absorber. The base valve then regulates the pressure inside one portion of the working chamber of the shock absorber so as to control damping. Another method for selectively changing the damping characteristics of a shock absorber is disclosed in PCT No. WO 86/06807 published Nov. 20, 1986. In one embodiment, this reference discloses the use of a pressure sensor to count the number of compression-rebound cycles of the absorber, as well as an accelerometer attached to the wheel support to determine the vertical velocity of the body of the automobile. The damping characteristics of the absorber are then changed in response to the vertical velocity of the body.

A further method for selectively changing the damping characteristics of shock absorbers is disclosed in co-pending U.S. Ser. No. 156,306 filed Feb. 16, 1988. In this application, the shock absorber includes a rotary valve which is able to change the amount of damping fluid flowing between the upper and lower portions of the working chamber in response to the angular displacement of the rotary valve. The angular displacment of the valve is in turn controlled by a D.C. motor and a disk-shaped contact element which provides information concerning the angular location of the shaft of the D.C. motor.

As will be seen from the above examples, methods for selectively varying the damping characteristics of shock absorbers generally use electrical current to either control a motor or the application of a magnetic field to a biasing member such as a valve plate or a solenoid. Accordingly, a need exists for an electrical connector which can deliver current from a power source to the electrical components in a shock absorber which are used to adjust damping characteristics.

SUMMARY OF THE INVENTION

Accordingly, it is a primary object of the present invention to provide an electrical connector which enables the electrical components in a shock absorber to receive current from a source of electrical potential located externally of the shock absorber. A related object of the present invention is to provide a connector which enables data from the electrical components inside a shock absorber to be delivered to processing electronics located outside the shock absorber so that the data may be evaluted.

Another object of the present invention is to provide an electrical connector which is compact and is less likely to mechanically interfere with the other components of the automobile. In this regard, a related object of the present invention is to provide an electrical connector having minimum length when assembled.

It is a further object of the present invention to provide a positive secure strain relief to the solenoid joined between an electrical connector and a flex circuit wire.

Another object of the present invention is to provide an electrical connector which is able to function under harsh environmental conditions which may occur under the hood and outside the underchassis of the automobile.

It is a further object of the present invention to provide a locking system on electrical connectors into a projectile deflection shield in the event of a small stone or such that may impact the connector system due to its locations.

Another object of the present invention is to incorporate identical parts of electrical connectors used in both front and rear shock absorbers.

It is a further object to provide a less expensive and relatively simple connector arrangement which may be used with shock absorbers.

BRIEF DESCRIPTION OF THE DRAWINGS

Various advantages of the present invention will become apparent to one skilled in the art upon reading the following specification and by reference to the following drawings in which:

FIG. 2 is a reduced side elevational view, partially broken away, of a shock absorber shown in FIG. 1 according to the first preferred embodiment of the present invention with an exposed adapter shaft;

FIG. 3 is a reduced elevated perspective exploded view of the upper portion of the shock absorber shown in FIG. 1 according to the first preferred embodiment of the present invention;

FIG. 4 is a side elevational view of the adapter shaft used in conjunction with the shock absorber according to the first preferred embodiment of the present invention as shown in FIG. 1;

FIG. 5 is a side elevational exploded view of the shock absorber according to the first embodiment of the present invention as shown in FIG. 1;

FIG. 6 is an enlarged side elevational view, partially broken away, of the shock absorber according to the first preferred embodiment of the present invention as shown in FIG. 1;

FIG. 7 is an enlarged side elevational view of the second preferred embodiment of the present invention as shown in FIG. 1 with the upper portion of the piston rod exposed;

FIG. 8 is an enlarged elevational view, partially broken away, of the second preferred embodiment of the present invention as shown in FIG. 1;

FIG. 9 is an enlarged elevated exploded view of the second preferred embodiment of the present invention as shown in FIG. 1; and FIG. 10 is a reduced elevated perspective exploded view of the upper portion of the shock absorber shown in FIG. 1 according to the second preferred embodiment of the present invention.

DESCRIPTION OF THE PREFERRED EMBODIMENTS

Figure 1:
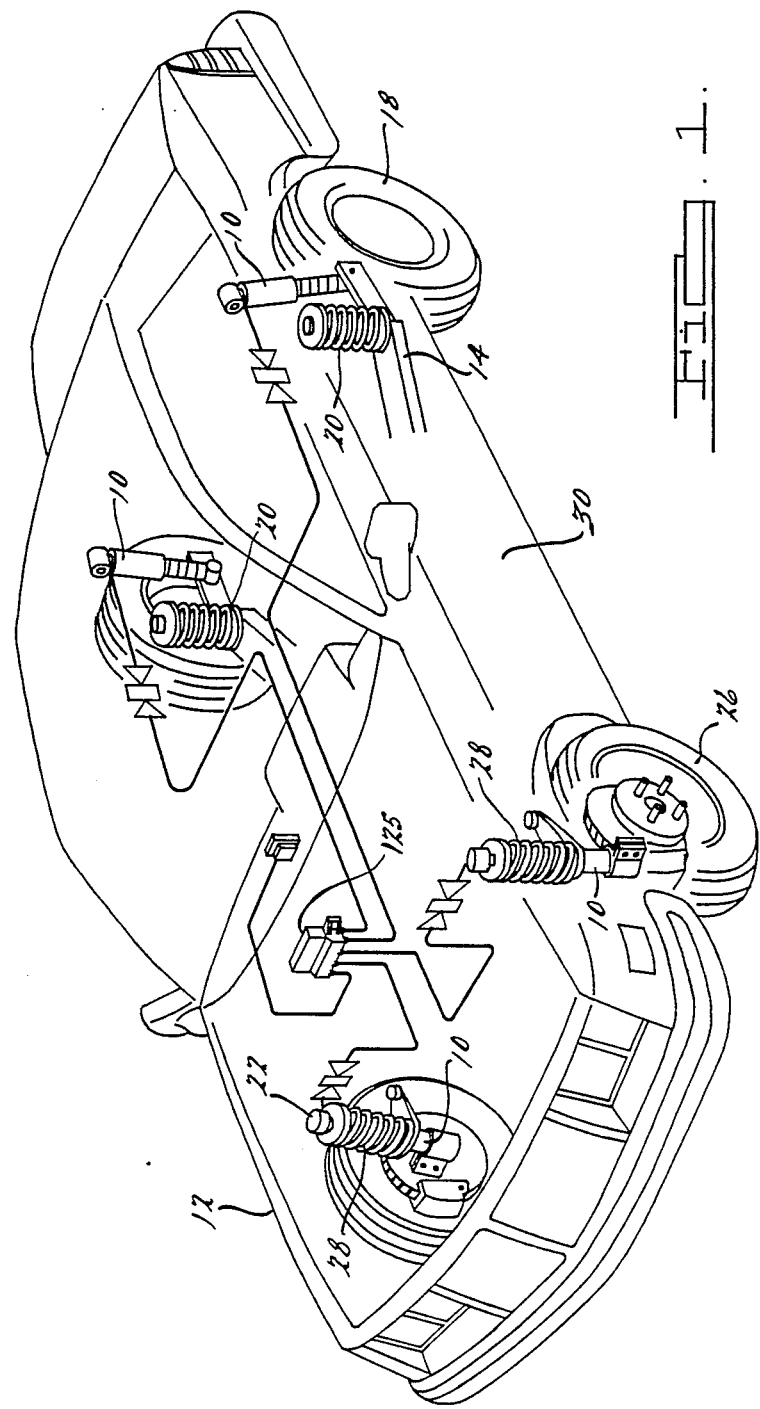
FIG. 1 is the schematic representation of the shock absorber according to the teachings of the preferred embodiments of the present invention as shown in operative association with the typical automobile.

Referring to FIG. 1, a plurality of four shock absorbers 10 in accordance with the preferred embodiments of the present invention are shown. The shock absorbers 10 are depicted in operative association with a diagrammatic representation of a conventional automobile 12. The automobile 12 includes a rear suspension 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil spring 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspensions 22 and 14) and the spring portion (i.e., the body 30) of the automobile 12. While the automobile 12 has been depicted as a passenger car, the shock absorber 10 may be used with other types of automotive vehicles as well.

With particular reference to FIG. 2, the shock absorber 10 acoording to the first preferred embodiment of the present invention is shown with the adapter shaft exposed. The shock absorber 10 comprises an elongated tubular pressure cylinder 32 defining a damping fluid-containing working chamber 34. Disposed within the working chamber 34 is a reciprocal piston 36 that is secured to one end of an axially extending piston rod 38.

The piston 36 includes a circumferential groove (not shown) operable to retain a piston ring 40 as is well-known in the art. The piston ring 40 is used to prevent damping fluid from flowing between the outer periphery of the piston 36 and the inner diameter of the pressure cyclinder 32 during movement of the piston 36. A base valve, generally designated by the numeral 42, is located within the lower end of the pressure cylinder 32 and is used to control the flow of damping fluid between the working chamber 34 and an annular fluid reservoir 44. The annular fluid reservoir 44 is defined as the space between the outer periphery of the pressure cylinder 32 and the inner periphery of a reservoir tube or cylinder 46 which is arranged essentially around the exterior of the pressure cylinder 32. The construction and operation of the base valve 42 may be of the type shown and described in U.S. Pat. No. 3,771,626, which is hereby incorporated by reference.

The upper and lower ends of the shock absorber 10 are provided with generally cup-shaped upper (not shown) and lower end caps 48 respectively. The lower end caps 48 are secured to opposing ends of the reservior tube 46 by a suitable means such as welding. Suitable end fittings 52 and 54 are secured to the upper end of the piston rod 38 and the lower end cap 48 for operatively securing the shock absorber 10 between both the body and the axle assembly of the automobile 12. Those skilled in the art will appreciate that, upon reciprocal movement of the piston 36, damping fluid within the pressure cylinder 32 is transferred between the upper and lower portions of the working chamber 34 and the annular fluid reservoir 44. By controlling the flow of damping fluid between the upper and lower portion of the working chamber 34, the shock absorber 10 is able to controllably dampen relative movement between the body and the suspension of the automobile 12 so as to optimize both ride, comfort and road handling ability. The piston 36 is provided with a valving arrangement for selectively controlling the flow of damping fluid between the upper and lower portions of the working chamber 34 during reciprocal movement thereof.

To support the piston 36 within the pressure cylinder 32, the piston 36 has a central bore (not shown) operable to receive an axially extending piston post 56. The piston post 56 has an upper portion 56 with an internally threaded central bore adapted to threadably engage an externally threaded lower end portion of the piston rod 38. The piston post 56 further includes a radially extending step (not shown) having an outside diameter greater than the diameter of the central bore of the piston 36. Because the radially extending step is disposed above the piston 36, the step limits upward movement of the piston 36 relative to the piston post 56. In addition, a piston retaining nut 58 is provided having an internally threaded bore which threadably engages an externally threaded lower portion of the piston post 56 at a position below the piston 36. Because the outside diameter of the piston retaining nut 58 is greater than the diameter of the central bore of the piston 36, the nut 58 prevents downward movement of the piston 36 relative to the piston post 56. The piston post 56 and the piston retaining nut 58 also serve to secure the innermost portions of two valve disks 60 and 62 which serves to regulate the flow of damping fluid between the upper and lower portions of the working chamber 34. In this regard, the innermost portion of the valve disk 60 engages both the radially extending step of the piston post 56 and the upper surface of the piston 36. In addition, the radailly innermost portion of the valve disk 62 engages the lower surface of the piston 36 and the piston retaining nut 58.

To bias the vale disks 60 and 62 against the piston 36, a pair of coaxially arranged, axially spaced, helical coil springs 64 and 66 are provided. The helical coil spring 64 is disposed coaxially with the piston post 56 between a radially extending step formed on the piston post 56 and a first intermediate backing plate 65 which is located coaxially with, and adjacent to, the upper surface of the valve disk 60. By means of the first intermediate backing plate 65, the helical coil spring 64 is able to resiliently and yieldably bias the valve disk 60 against the upper surface of the piston 36. Similarly, the helical coil spring 66 is disposed between a radially extending flange 78 on the piston retaining nut 58 and a second intermediate backing plate 68 which is located adjacent to, and coaxially with, the valve disk 62. The helical coil spring 66 is therefore able to resiliently and yieldably bias the valve disk 62 against the lower surface of the piston 36 via the second intermediate backing plate.

As described above, the flow of damping fluid between the upper and lower portions of the working chamber 34 is controlled by the position of the valve disks 60 and 62. When the valve disk 60 is displaced in an upward direction from the piston 36, the amount of fluid flowing from the lower portion of the working chamber 34 to the upper portion of the working chamber 34 increases thereby producing a soft compression stroke. When the valve disk 62 is displaced in a downward direction from the piston 36, the amount of fluid able to flow from the upper portion of the working chamber 34 to the lower portion of the working chamber 34 increases thereby producing a soft rebound stroke. The position of the valve disks 60 and 62 are controlled by a solenoid (not shown) which is disposed within the piston 36 and is electrically actuated while the valve disks 60 and 62 and the solenoid are used for regulating the flow of damping fluid between the upper and lower portions of the working chamber 34, other valves means may also be used.

To provide means for securing the shock absorber 10 to a female connector assembly described below, the shock absorber 10 includes an annular adapter shaft 70. The annular adapter shaft 70 is disposed partially within a radially extending passage 72 in the shock absorber 10 which communicates with an axially extending passage 74. While the annular adapter shaft 70 may be secured to the shock absorber 10 by resistive welding, other suitable means may be used. The annular adapter shaft 70 includes a central bore 76 of sufficient diameter to accommodate a female connector assembly described below, as well as a radially extending flange 78 having an annular groove 80 disposed on the outer periphery thereof. The annular groove 80 is used for receiving a plurality of locking members of a latching cap described below to secure the latching cap to the shock absorber 10. The annular adapter shaft 70 also includes a circular aperture 82 in close proximity to the end furthest from the piston rod 38 which is used to receive a flexible locking beam in the female connector assembly. Finally, the annular adapter shaft 70 also includes an axially extending anti-rotation slot 84 in the end of the annular adapter shaft 70 furthest from the piston rod 38 which is used to receive an anti-rotation key in the female connector assembly as described below.

To provide first means for electrically accessing the components inside the shock absorber 10, a female connector assembly 86 is provided. The female connector assembly 86 includes a reduced diameter portion 88 having an open end 90. When assembly in the manner shown in FIG. 6, the open end 90 of the reduced diameter portion 88 is located within the radially extending passage 72 so as to allow a flex cable 94 inside the axially extending passage 74 to enter the female connector assembly 86.

The female connector assembly 86 further comprises a plurality of axially extending grooves 96 disposed on the interior of the female connector assembly 86. The axially extending grooves 96 are used to receive a plurality of female contacts 98 which are stake fit within the axially extending grooves 96. Each lead from the flex cable 94 is electriically connected to one of the female contacts 98. While the female contacts 98 may be made from tempered phosphor bronze with tin plating and copper flash, other suitable materials may be used.

To permit assembly of the female connector assembly 86, the female connector assembly 86 is formed in two annular portions 100 and 102 which are connected by a hinge 103. The hinge 103 allows the annular portion 100 to be separated from the annular portion 102 to allow female contacts 98 to be inserted within the axially extending grooves 96 of the female connector assembly 86. Once the female contacts 98 are located within the female connector assembly 86, the annular portion 100 is angularly displaced about its hinge 103 so that the annular portion 100 closes about the annular portion 102. Further, by closure of the annular portion 100 about the annular portion 102, the female connector assembly 86 is able to provide strain relief for the flex cable 94 so as to minimize the possibility that the leads of the flex cable 94 will become detached from the female contacts 98.

The female connector assembly 86 also comprised an anti-rotation key 104 which radially extends from the leftmost portion of the female connector assembly 86. The anti-rotation key 104 mates with the axially extending anti-rotation slot 84 in the annular adapter shaft 70 which thereby prevents rotation of the female connector assembly 86 during use. In addition, the female connector assembly 86 further includes a radially extending flexible locking beam 105. When the female connector assembly 86 is inserted into the adapter shaft 70, the flexible locking beam 105 engages the aperture 82 so as to secure the female connector assembly 86 to the annular adaptor shaft 70.

To provide second means for electrically accessing the components in the shock absorber 10, a male connector assembly 106 is provided. The male connector assembly 106 includes a first hinged portion 108 and a second hinged portion 110. The first hinged portion 108 comprises an annular body 112 with a sufficient inside diameter to receive the female connector assembly 86. The annular body 112 includes a plurality of axially extending projections 114 which are disposed on the interior surface of the first hinged portion 108. The axially extending projections 114 are used to secure a plurality of male contacts 119 by stake fitting in a position in which male contacts 119 engage the female contacts 98 in the female connector assembly 86. While the male contacts 119 may be made from tempered phosphor bronze with tin plating and copper flash, other suitable materials may be used. The first hinged portion 108 further comprises a radially extending projection 122 which mates with a radially extending projection 116 in the second hinged portion 110. The radially extending projections 116 and 122 are used to accommodate a radial projection of an insulator boot described below.

The annular body 112 further comprises a coaxial annular groove 120 on its interior surface. The coaxial annular groove 120 is used to receive an annular seal 121 which also engages the female connector assembly 86 when installed. The annular seal 121 is used to prevent moisture and other contaminants from adversely influencing electrical communication between the female connector assembly 86 and the male connector assembly 106.

An insulator boot 123 is also provided which is used for insulating adjacent male and female contacts 119 and 98 when the female connector assembly 86 is inserted into the male connector assembly 106. The insulator boot 123 has a radially extending projection 124 which is able to mate with the radially extending projection 122 of the first hinged portion 108 and the radially extending projection 116 of the second hinged portion 110. Accordingly, electrical wiring 126 carrying current from a source 125 of electrical potential is able to pass through the radial extending projection 124 of the insulator boot 123 and thereby allowing contact between the leads of the electrical wiring 126 and the male contacts 119. The insulator boot 123 may preferably be made from Santoprene thermoplastic rubber, though it is to be understood that other suitable materials may be used.

To provide means for securing the male connector assembly 106 to the female connector assembly 86 and to provide a protective covering for the male connector assembly 106 so as to resist impact of road debris, a latching cap 128 is provided. The latching cap 128 secures the male connector assembly 106 to the female connector assembly 86 by allowing the latching cap 128 to engage the shock absorber 10. The latching cap 128 is cylindrically shaped and includes a plurality of axially extending circumferentially spaced locking members 130 on its periphery. Each of the locking members 130 include projecting leg portions 132 which are adapted to engage the annular groove 80 in the annular adapter shaft 70. In addition, the latching cap 128 includes a plurality of stanchions 134 which permit limited rotation of the locking members 130 with respect to the axis of the annular adapter shaft 70 so as to allow engagement of the locking members 130 in the annular groove 80. Accordingly, when the latching cap 128 is displaced towards the annular adapter shaft 70, the projecting leg portions 132 slip over a portion of the radially extending flange 78 on the annular adapter shaft 70 until the projecting leg portions 132 engage the annular groove 80, thereby securing the male connector assembly 106 to the female connector assembly 86. Finally, the latching cap 128 has an axially extending groove 136 on its surface to accommodate the radial extending projection 124 of the insulator boot 123.

During assembly, the annular adapter shaft 70 is inserted into the radially extending passage 72 in the shock absorber 10 and is secured be resistive welding. The flex cable 94 is then fed through the axially extending passage 74 in the piston rod 38 and through the central bore 76 of the annular adapter shaft 70. The flex cable 94 is then passed through the end 70 of the female connector assembly 86 so that the leads to the flex cable 94 may be soldered to the female contacts 98 which have been stake fit into the radially extending grooves 96. The female connector assembly 86 is then inserted into the central bore 76 of the annular adapter shaft 70 in such a manner so that the anti-rotation key 104 is disposed within the axially extending anti-rotation slot 84 of the annular adapter shaft 70. In addition, the flexible locking beam 105 is then disposed in the aperture 82 of the annular adapter shaft 70 so as to secure the female connector assembly 86 to the annular adapter shaft 70.

After the electrical wiring 126 from the source of electrical potential has been inserted through the radially extending projection 124 of the insulator boot 123, the leads of the electrical wiring 126 are attached to the male contacts 119 which have been stake fit into the axially extending projections 114 in the interior surface of the annular body 112. After the second hinged portion 110 is close over the first hinged portion 108, the latching cap 128 is placed over the male connector assembly 106 and is displaced toward the annular adapter shaft 70 so as to cause the projecting leg portions 132 of the locking members 130 to engage the annular groove 80. If the latching cap 128 is to be removed, the locking members 130 are depressed at a portion away from the shock absorber 10 thereby causing the projecting leg portions 132 to be removed from the annular groove 80 so as to cause disengagement of the latching cap 128 from the annular adapter shaft 70.

The present invention will now be described according to the second preferred embodiment as shown in FIGS. 7-10. To provide means for interfacing the shock absorber 10 with a female connector assembly described below, the piston rod 138 includes an annular adapter shaft portion 170. The annular adapter shaft portion 170 includes a axially extending passage 176 of sufficient diameter to accommodate a female connector assembly, as well as an annular groove 180 disposed on the outer periphery thereof. The annular groove 180 is used for receiving a plurality of connector mating locking beams of the male connector assembly described below to thereby secure the male connector assembly to the shock absorber 10. The annular adapter shaft portion 170 also includes an aperture 182 in close proximity to the end of the piston rod 138 which is used to receive a flexible locking beam in the female connector assembly described below. Finally, the annular adapter shaft portion 170 also includes an axially extending anti-rotation slot 184 in the end of the annular adapter shaft portion 170 furthest from the piston rod 138 which is used to receive an anti-rotation key in the female adapter assembly.

To provide first means for electrically accessing the components inside the shock absorber 10, a female connector assembly 186 is provided. The female connector assembly 186 includes a reduced diameter portion 188 having an open end 190. When assembled in the manner shown in FIG. 8, the open end 190 of the reduced diameter portion 188 is located within the axially extending passage 176 in the piston rod 138 so as to allow a flex cable 194 inside the axially extending passage 176 to enter the female connector assembly 186.

The female connector assembly 186 comprises a plurality of axially extending grooves 196 disposed on the interior of the female connector assembly 186. The axially extending grooves 196 are used to receive a plurality of female contacts 198 which are stake fit within the axially extending grooves 196. Each lead from the flex cable 194 is electrically connected to one of the female contacts 198. While the female contacts 198 may be made from tempered phosphor bronze with tin plating and copper flash, other suitable materials may be used.

To permit assembly of the female connector assembly 186, the female connector assembly 186 is formed in two annular portions 200 and 202 which are connected by a hinge 203. The hinge 203 allows the annular portion 200 to be separated from the annular portion 202 to allow female contacts 198 to be inserted within the axially extending grooves 196 of the female connector assembly 186. Once the female contacts 198 are located within the female connector assembly 186, the annular portion 200 is angularly displaced about its hinge 203 so that the portion 200 closes about the annular portion 200. Further, by closure of the annular portion 200 about the annular portion 202, the female connector assembly 186 is able to provide strain relief for the flex cable 194 so as to minimize the possiblity that the leads of the flex cable 194 will become detached from the female contacts 198.

The female connector assembly 186 also has an anti-rotation key 204 which radially extends from the leftmost portion of the female connector assembly 186. The anti-rotation key 204 mates with the axially extending anti-rotation slot 184 in the adapter shaft portion 170 which thereby prevents rotation of the female connector assembly 186 during use. In addition, the female connector assembly 186 further includes a radially extending flexible locking beam 205. When the female connector assembly 186 is inserted into the adaptor shaft 170, the flexible locking beam 205 engages the aperture 182 so as to secure the female connector assembly 186 to the adaptor shaft 170.

To provide second means for electrically accessing the components in the shock absorber 10, a male connector assembly 206 is provided. The male connector assembly 206 includes a first hinged portion 208 and a second hinged portion 210. The first hinged portion 208 comprises an annular body 212 with a sufficient inside diameter to receive the female connector assembly 186. The annular body 212 includes a plurality of inwardly extending axial projections 214 which are disposed on the interior surface of the first hinged portion 208. The inwardly extending axial projections 214 are used to secure a plurality of male contacts 219 by stake fitting in a position in which male contacts 219 engage the female contacts 198 in the female connector assembly 186. While the male contacts 219 may be made from tempered phosphor bronze with tin plating and copper flash, other suitable materials may be used. The first hinged portion 208 further comprises a radially extending projection 216 which mates with a radially extending projection 222 in the second hinged portion 210. The radially extending projections 216 and 222 are used to accommodate a radial projection of an insulator boot described below.

The annular body 212 further comprises a coaxial annular groove 220 on its interior surface. The coaxial annular groove 220 is used to receive an annular seal 221 which also engages the female connector assembly 186 when installed. The annular seal 221 is used to prevent moisture and other contaminants from adversely influencing electrical communication betweent the female connector assembly 186 and the male connector assembly 206.

To provide means for securing the male connector assembly 206 to the female connector assembly 186, the male connector assembly 206 includes a plurality of axially extending circumferentially spaced connector mating locking beams 230 on its periphery. The connector mating locking beams 230 include projecting leg portions 232 which are adapted to engage the annular groove 180 in the annular adapter shaft portion 170. In addition, the male connector assembly 228 includes a plurality of stanchions 234 which permit limited rotation of the connector mating locking beams 230 with respect to the axis of the annular adapter shaft portion 170 so as to allow engagement of the connector mating locking beams 230 in the annular groove 180. Accordingly, when the male connector assembly 206 is displaced towards the adapter shaft portion 170, the projecting leg portions 232 slip over a portion of the annular adapter shaft portion 170 until the projecting leg portions 232 engage the annular groove 180, thereby securing the male connector assembly 206 to the female connector assembly 186.

An insulator boot 223 is also provided which is used for insulating adjacent male and female contacts 219 and 198 when the female connector assembly 186 is inserted into the male connector assembly 206. The insulator boot 223 has a radially extending projection 224 which is able to mate with the radially extending projection 216 of the first hinged portion 208 and the radially extending projection 216 of the second hinged portion 210. Accordingly, electrical wiring 226 carrying current from a source of electrical potential is able to pass through the radial extending projection 224 of the insulator boot 223 and thereby allowing contact between the leads of the electrical wiring 226 and the male contacts 219. The insulator boot 223 may preferably be made from Santoprene thermoplastic rubber, though it is to be understood that other suitable materials may be used.

During assembly, the flex cable 194 is fed through the axially extending passage 172 in the piston rod 138 and through the axially extending passage 176 of the annular adapter shaft portion 170. The flex cable 194 is then passed through the end 190 of the female connector assembly 186 so that the leads of the flex cable 194 may be soldered to the female contacts 198 which have been press fit into the axially extending grooves 196 of the female connector assembly 186. The female connector assembly 186 is then inserted into the axially extending passage 176 of the annular adapter shaft portion 170 in such a manner that the anti-rotation key 204 is disposed within the axially extending anti-rotation slot 184 of the annular adapter shaft portion 170. In addition, the flexible locking beam 205 is then disposed in the aperture 182 of the annular adapter shaft portion 170 so as to secure the female connector assembly 86 to the annular adapter shaft portion 170.

After the electrical wiring 226 has been inserted through the radially extending projection 224 of the insulator boot 223, the leads of the electrical wiring 226 are attached to the male contact 219 which have been stake fit into the axially extending projections 214 in the interior surface of the annular body 212. After the second hinged portion 210 is closed over the first hinged portion 208, the male connector assembly 206 is displaced toward the annular adapter shaft portion 170 so as to cause the projecting leg portion 132 of the connector mating locking beams 230 to engage the annular groove 180. If the male connector assembly 228 is to be removed, the connector mating locking beams 230 are depressed at a portion away from the shock absorber 10 thereby causing the projecting leg portions 232 to be removed from the annular groove 180 so as to cause disengagement of the male connector assembly 206 from the annular adapter shaft portion 170.

The present invention has been described in an illustrative manner, and it is to be understood that the terminology which has been used is intended to be in the nature of words of description rather than of limitation. It will be seen that the present invention enables the electrical components in the shock absorber to receive current from a source of electrical potential, as well as enabling data from electrical components inside the shock absorber to be delivered to processing electronics located outside the shock absorber. Further, because the electrical connectors of the present invention is compact and is of reduced length, the present invention is less likely to interfere with the other components of the automobile. In addition, by providing a hinged female connector, the present invention is able to provide strain relief for the flex cables used to carry electrical signals to and from the electrical components in the shock absorber. The present invention is able to operate under harsh environmental conditions and is able to resist impact of road debris. Further, the present invention incorporates similar components in each embodiment.

Obviously, many modifications and variations of the present invention are possible in light of the above teachings. For example, the invention may be used to allow data from the electrical components inside a shock absorber to be delivered to processing electronics located outside the shock absorber or vice versa so that the data may be evaluated. In addition, the insulator boot may be overmolded into the male connector assembly. It is, therefore, to be understood that within the scope of the appended claims, the present invention may be practiced otherwise than as specifically described.

What is claimed is:

1. A shock absorber electrically communicating with a source of electrical potential external to said shock absorber, said shock absorber comprising:
   a pressure cylinder forming a working chamber to store damping fluid;
   a reciprocating piston disposed within said working chamber operable to divide said working chamber into first and second portions;
   an axially extending piston rod disposed in said working chamber and connected to said piston;
   valve means for electrically controlling the flow of damping fluid between said first and second portions of said working chamber; and
   connector means for allowing said valve means to be connected to said source of electrical potential, said connector means comprising:
   an adapter shaft mechanically communicating with said piston rod,
   a female connector assembly disposed partially within said adapter shaft and electrically communicating with said valve means, said female connector assembly including an anti-rotation key mechanically communicating with an anti-rotation slot in said adapter shaft, said anti-rotation key operable to prevent rotation between said female connector assembly and said adapter shaft,
   a male connector assembly electrically communicating with said female connector assembly and said source of electrical potential,
   first locking means for securing said male connector assembly to said female connector assembly, said first locking means comprising a latching cap having a plurality of locking members disposed circumferentially about said latching cap, said locking members operable to engage an annular groove formed in the periphery of said adapter shaft, and
   second locking means for securing said female connector assembly to said adapter shaft.

2. The shock absorber as set forth in claim 1, wherein said plurality of locking members comprises a plurality of connected mating locking beams disposed on said male connector assembly operable to enage an annular groove formed in the periphery of said adapter shaft.

3. The shock absorber as set in claim 1, wherein said second locking means comprises a flexible locking beam disposed on said female connector assembly operable to engage an aperture in said adapter shaft.

4. The shock absorber as set forth in claim 3, wherein said female connector assembly comprises a plurality of female contacts disposed within a plurality of axial grooves in said female connector assembly.

5. The shock absorber of claim 4, wherein said female connector assembly further comprise two annular portions connected by a hinge.

6. The shock absorber of claim 5, wherein said male connector assembly comprises a plurality of male contacts which are secured to a plurality of axially extending projections located on the interior of said male connector assembly, said male contacts being operable to engage said female contacts.

7. The shock absorber of claim 6, wherein said connector means comprises an insulator boot disposed within said male connector assembly for electrically insulating said male and female contacts.

8. A shock absorber electrically communicating with a source of electrical potential external to said shock absorber, said shock absorber comprising:
   a pressure cylinder forming a working chamber to store damping fluid;
   a reciprocating piston disposed in said working chamber operable to divide said working chamber formed by said pressure cylinder into first and second portions;
   an axially extending piston rod having an axially extending passage;
   an end fitting operably securing said piston rod to the body of the automobile;
   said piston being secured to said piston rod by a piston post fixedly secured to said piston rod;
   said piston rod having an end portion adapted to engage a central bore of said piston post;
   said piston having a central bore operable to receive said piston post;
   valve means for controlling the flow of damping fluid between said first and second portions of said working chamber;
   connector means secured to said piston rod for allowing electrical communication between said valve means and said source of electrical potential, said connector means comprising an adapter shaft communicating with the axially extending passage of said piston rod, a female connector assembly disposed partially within said adapter shaft, a male connector assembly electrically communicating with said female connector assembly and said source of electrical potential, and means for securing said male connector assembly to said female connector assembly comprising a latching cap.

9. The shock absorber as set forth in claim 8, wherein said latching cap comprises a plurality of axially extending circumferentially spaced locking members.

10. The shock absorber as set forth in claim 9, wherein said locking members comprise a plurality of projecting leg portions.

11. The shock absorber as set forth in claim 10, wherein said adapter shaft comprises an annular groove operable to receive said projecting leg portions of said locking members.

12. The shock absorber as set forth in claim 8, further comprises a insulator boot for electrically insulating said female connector assembly and said male connector assembly.

13. A shock absorber having at least one internal electrical component electrically communicating with a source of electrical potential external of said shock absorber, said shock absorber comprising:
  first connector means for electrically accessing said electrical component;
  means for securing said first electrical connector to said shock absorber, said means for securing said first connector means to said shock absorber comprises an annular adapter shaft, said adapter shaft having a central bore of sufficient diameter to accommodate said first connector means, said annular adapter shaft further comprising an annular groove disposed on the outer periphery thereof, said annular adapter shaft further comprising an anti-rotation slot cooperating with said first connector means operable to prevent rotation of said first connector means with respect to said shock absorber;
  second connector means for electrically accessing said electrical component, said first connector means being removably secured to said second connector means and electrically communicating with said first connector means and said source of electrical potential; and
  means for securing said second connector means to said first connector means.

14. The shock absorber as set forth in claim 13, wherein said first connector means comprises a female connector assembly having a plurality of axially extending grooves upon which a plurality of female contacts are disposed, said female connector assembly further comprising two annular portions which are connected by a hinge, said female connector assembly further comprising an anti-rotation key cooperating with said means for securing said first connector means to prevent rotation of said female connector assembly with respect to said shock absorber, said female connector assembly further comprising a flexible locking beam cooperating with said means for securing said first connector means to prevent removal of said female connector assembly.

15. The shock absorber as set forth in claim 13, wherein said second connector means comprises a male connector assembly having first and second hinged portions, said first hinged portion comprising an annular body of sufficient inside diameter to receive said first connector means, said annular body having a plurality of inwardly extending axially projections upon which are disposed a plurality of male contacts.

16. The shock absorber as set forth in claim 13, wherein said means for securing said second connector means comprises a latching cap having a plurality of axially extending circumferentially spaced locking members on its periphery, each of said locking members including leg portions which are adapted to engage said means for securing said first connector means to said shock absorber.

17. The shock absorber as set forth in claim 13, wherein said means for securing said second connector means comprises a plurality of axially extending circumferentially spaced connector mating lock beams disposed on the periphery of said second connector means, each of said connector mating locking beams including a projecting leg portion adapted to engage said means for securing said first connector means.

18. The shock absorber as set forth in claim 13, wherein said shock absorber further comprises an insulator boot for electrically insulating said first connector means and said second connector means.

19. A shock absorber having at least one internal electrical component electrically communicating with a source of electrical potential external of said shock absorber, said shock absorber comprising:
  first connector means for electrically accessing said electrical component comprising a female connector assembly having a plurality of axially extending grooves upon which a plurality of female contacts are disposed, said female connector assembly further comprising two annular portions which are connected by a hinge, said female connector assembly further comprising an anti-rotation key and a flexible locking beam;
  means for securing said first electrical connector to said shock absorber, said means for securing said first connector means cooperating with the anti-rotation key of said female connector assembly to prevent rotation of said female connector assembly with respect to said shock absorber, said means for securing said first connector means further cooperating with said flexible locking beam of said female connector assembly to prevent removal of said female connector assembly;
  second connector means for electrically accessing said electrical component, said first connector means being removably secured to said second connector means and electrically communicating with said first connector means and said source of electrical potential; and
  means for securing said second connector means to said first connector means.

20. The shock absorber as set forth in claim 19, wherein said means for securing said first connector means to said shock absorber comprises an annular adapter shaft, said adapter shaft having a central bore of sufficient diameter to accommodate said first connector means, said annular adapter shaft further comprising an annular groove disposed on the outer periphery thereof, said annular adapter shaft further comprising an anti-rotation slot cooperating with said anti-rotation key operable to prevent rotation of said first connector means with respect to said shock absorber.

21. The shock absorber as set forth in claim 19, wherein said second connector means comprises a male connector assembly having first and second hinged portions, said first hinged portion comprising an annular body of sufficient inside diameter to receive said first connector means, said annular body having a plurality of inwardly extending axially projections upon which are disposed a plurality of male contacts.

22. The shock absorber as set forth in claim 19, wherein said means for securing said second connector means comprises a latching cap having a plurality of axially extending circumferentially spaced locking members on its periphery, each of said locking members including leg portions which are adapted to engage said means for securing said first connector means to said shock absorber.

23. The shock absorber as set forth in claim 19, wherein said means for securing said second connector means comprises a plurality of axially extending circumferentially spaced connector mating lock beams disposed on the periphery of said second connector means, each of said connector mating locking beams including a projecting leg portion adapted to engage said means for securing said first connector means.

24. The shock absorber as set forth in claim 19, wherein said shock absorber further comprises an insulator boot for electrically insulating said first connector means and said second connector means.

25. A shock absorber having at least one internal electrical component electrically communicating with a source of electrical potential external of said shock absorber, said shock absorber comprising:
first connector means for electrically accessing said electrical component;
means for securing said first electrical connector to said shock absorber;
second connector means for electrically accessing said electrically component, said second connector means being removably secured to said first connector means and electrically communicating with said first connector means and said source of electrical potential, said second connector means comprising a male connector assembly having first and second hinged portions, said first hinged portion comprising an annular body of sufficient inside diameter to receive said first connector means, said annular body having a plurality of inwardly extending axially projections upon which are disposed a plurality of male contacts; and
means for securing said second connector means to said first connector means.

26. The shock absorber as set forth in claim 25, wherein said first connector means comprises a female connector assembly having a plurality of axially extending grooves upon which a plurality of female contacts are disposed, said female connector assembly further comprising two annular portions which are connected by a hinge, said female connector assembly further comprising an anti-rotation key cooperating with said means for securing said first connector means to prevent rotation of said female connector assembly with respect to said shock absorber, said female connector assembly further comprising a flexible locking beam cooperating with said means for securing said first connector means to prevent removal of said female connector assembly.

27. The shock absorber as set forth in claim 25, wherein said means for securing said first connector means to said shock absorber comprises an annular adapter shaft, said adapter shaft having a central bore of sufficient diameter to accommodate said first connector means, said annular adapter shaft furhter comprising an annular groove disposed on the outer periphery thereof, said annular adapter shaft further comprising an anti-rotation slot cooperating with said first connector means operable to prevent rotation of said first connector means with respect to said shock absorber.

28. The shock absorber as set forth in claim 25, wherein said means for securing said second connector means comprises a latching cap having a plurality of axially extending circumferentially spaced locking members on its periphery, each of said locking members including leg portions which are adapted to engage said means for securing said first connector means to said shock absorber.

29. The shock absorber as set forth in claim 25, wherein said means for securing said second connector means comprises a plurality of axially extending circumferentially spaced connector mating lock beams disposed on the periphery of said second connector means, each of said connector mating locking beams including a projecting leg portion adapted to engage said means for securing said first connector means.

30. The shock absorber as set forth in claim 25, wherein said shock absorber further comprises an insulator boot for electrically insulating said first connector means and said second connector means.

31. A shock absorber having at least one internal electrical component electrically communicating with a source of electrical potential external of said shock absorber, said shock absorber comprising:
first connector means for electrically accessing said electrical component;
means for securing said first electrical connector to said shock absorber;
second connector means for electrically accessing said electrical component, said second connector means being removably secured to said first connector means and electrically communicating with said first connector means and said source of electrical potential, said second connector means comprising a plurality of axially extending circumferentially spaced connector mating lock beams disposed on the periphery of said second connector means, each of said connector mating locking beams including a projecting leg portion; and
means for securing said second connector means to said first connector means, said projecting leg portion of each of said connector mating locking beams being adapted to engage said means for securing said first connector means.

32. The shock absorber as set forth in claim 31, wherein said first connector means comprises a female connector assembly having a plurality of axially extending grooves upon which a plurality of female contacts are disposed, said female connector assembly further comprising two annular portions which are connected by a hinge, said female connector assembly further comprising an anti-rotation key cooperating with said means for securing said first connector means to prevent rotation of said female connector assembly with respect to said shock absorber, said female connector assembly further comprising a flexible locking beam cooperating with said means for securing said first connector means to prevent removal of said female connector assembly.

33. The shock absorber as set forth in claim 31, wherein said means for securing said first connector means to said shock absorber comprises an annular adapter shaft, said adapter shaft having a central bore of sufficient diameter to accommodate said first connector means, said annular adapter shaft further comprising an annular groove disposed on the outer periphery thereof, said annular adapter shaft further comprising an anti-rotation slot cooperating with said first connector means operable to prevent rotation of said first connector means with respect to said shock absorber.

34. The shock absorber as set forth in claim 31, wherein said second connector means comprises a male connector assembly having first and second hinged portions, said first hinged portion comprising an annular body of sufficient inside diameter to receive said first connector means, said annular body having a plurality of inwardly extending axially projections upon which are disposed a plurality of male contacts.

35. The shock absorber as set forth in claim 31, wherein said shock absorber further comprises an insulator boot for electrically insulating said first connector means and said second connector means.

* * * * *

UNITED STATES PATENT AND TRADEMARK OFFICE
CERTIFICATE OF CORRECTION

PATENT NO. : 4,846,318

DATED : July 11, 1989

INVENTOR(S) : Gary W. Groves

It is certified that error appears in the above-identified patent and that said Letters Patent is hereby corrected as shown below:

Col. 3, line 47, "spring" should be --springs--;

Col. 3, line 62, "acoording" should be --according--;

Col. 4, line 11, "reservior" should be --reservoir--(2nd occurrence);

Col. 4, lines 22-23, "reservior" should be --reservoir--;

Col. 4, line 45, after "portion" delete --56--;

Col. 5, line 4, "vale" should be --valve--;

Col. 6, line 15, "electriically" should be --electrically--;

Col. 6, line 36, "comprised" should be --comprises--;

Col. 6, line 48, "adaptor" should be --adapter--;

Col. 7, line 65, "to" should be --of--;

Col. 8, line 15, "close" should be --closed--;

Col. 8, line 32, "a" should be --an--

Col. 9, line 14, "200" should be --202-- (1st occurrence);

Col. 9, line 29, "adaptor" should be --adapter--;

Col. 9, line 32, "adaptor" should be --adapter--;

Col. 9, line 62, "betweent" should be --between--;

UNITED STATES PATENT AND TRADEMARK OFFICE
CERTIFICATE OF CORRECTION

PATENT NO. : 4,846,318

DATED : July 11, 1989

INVENTOR(S) : Gary W. Groves

Page 2 of 2

It is certified that error appears in the above-identified patent and that said Letters Patent is hereby corrected as shown below:

Col. 10, line 62, "portion" should be --portions--;

Col. 11, line 13, "is" should be --are--;

Col. 11, line 14, "is" should be --are--;

Col. 12, line 13, claim 3, after "set" insert --forth--;

Col. 12, line 22, claim 5, "comprise" should be --comprises--;

Col. 13, line 12, claim 12, "a" should be --an--;

Col. 15, line 28, claim 25, "electrically" should be --electrical--;

Col. 15, line 63, claim 27, "furhter" should be --further--.

Signed and Sealed this

Third Day of December, 1991

Attest:

HARRY F. MANBECK, JR.

Attesting Officer

Commissioner of Patents and Trademarks